J. ENRIGHT.
Valve.

No. 214,286. Patented April 15, 1879.

Witnesses.
W. F. Beecher
James Gay

Inventor.
John Enright
Per Butridge & Co.

UNITED STATES PATENT OFFICE.

JOHN ENRIGHT, OF CLEVELAND, OHIO.

IMPROVEMENT IN VALVES.

Specification forming part of Letters Patent No. 214,286, dated April 15, 1879; application filed January 10, 1879.

*To all whom it may concern:*

Be it known that I, JOHN ENRIGHT, of Cleveland, in the county of Cuyahoga and State of Ohio, have invented a certain new and Improved Valve; and I do hereby declare that the following is a full, clear, and complete description of the same.

In a former patent issued to me on the 3d day of December, 1878, No. 210,414, I use a gland-nut for packing the chamber in a pipe-coupling, and I do not now lay any claim to such device. In this application I employ a gland-nut with a handle in connection with the stem of a screw-valve, so that the valve may be continuously packed while the machine is in operation, as will hereinafter be described.

This invention relates to a valve opened and closed by a screw-stem. Said stem is screwed into a nut, also into a boss or collar, in which is a recess adapted to receive packing and the nut alluded to, down upon which packing the said nut is screwed, thereby compressing the packing around the screw-stem of the valve, making the same gas-tight.

The above-said valve is used in connection with a gas-pump, condenser, &c., employed in the manufacture of ice, for which purpose a very permeating gas under pressure is used, requiring the most careful defense against its escape, and which defense is had by the valve above referred to, a full and complete description of which is as follows, reference being had to the annexed drawings for illustrating the same, in which—

Figure 1:
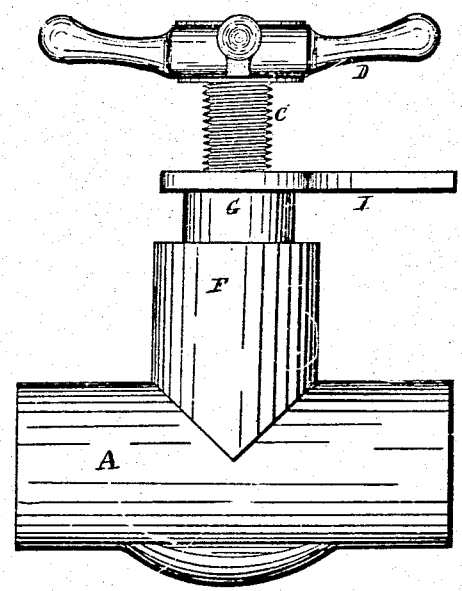
Figure 2:
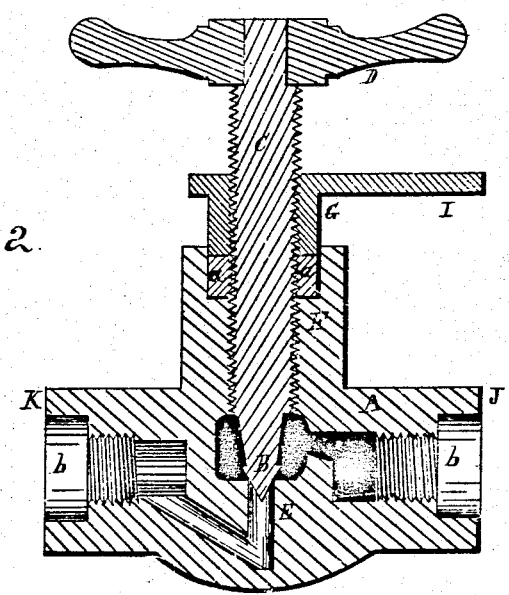

Figure 1 is an exterior view of the combined screw-joint and valve. Fig. 2 is a vertical section.

Like letters of reference refer to like parts in the several views.

In the drawings, A represents a valve-chamber; B, the valve, terminating the end of the valve-stem C, on which is cut a thread extending upward from the valve to the handle D.

The valve, as will be seen in Fig. 2, closes the end of the conduit E, said end forming the valve-seat.

F is a boss formed on the side of the valve-chamber. In said boss is a recess adapted to receive the nut G and a packing, a, partially filling the recess, down upon which the nut is screwed by the handle I, thereby compressing the packing closely and firmly around the screw-valve stem and against the sides of the recess.

It will be seen in Fig. 2 that the valve stem is not only screwed into the nut G, but also into the metal of the boss and that of the valve-chamber, through which it projects into the hollow above and about the valve.

In practical use the above-described valve is to be inserted in length of pipes. The end of one section of pipe is screwed into the end J of the chamber, and the end of the other section of pipe is screwed into the opposite end, K.

It will thus be seen that the chamber forms a union or coupling for connecting the pipes. The valve is shown in the drawings as closed; hence no gas can pass through the chamber from J to K, nor can the gas escape up around the stem of the valve, as the nut, on being screwed down over the valve-stem into the recess containing the packing, crowds the said packing about the stem and sides of the recess.

Should the packing become loose it can at once be tightened by giving a turn to the nut, which, as will be obvious, will follow down upon the packing continuously.

Each end of the valve-chamber is provided with a recess, b, and a female screw, into which the ends of the sections of pipes to be attached to the chambers are screwed.

The thread on the end of the pipe is cut far enough back to allow a nut like the nut G to be screwed onto it so far as to permit the end of the pipe projecting from the nut to screw into the chamber at the bottom of the recess. Said recess being partially filled with packing, the nut is then screwed down into the recess upon the packing, substantially as the nut G is screwed down, and for a similar purpose—viz., making the connection of the pipe with the valve-chamber gas-tight.

What I claim as my invention, and desire to secure by Letters Patent, is—

The combination of the boss F, the gland-nut G, and screw-stem C, and valve-chamber A, the stem C having a screw-thread, on which the gland-nut is regulated for packing the chamber, and which thread also works in the stock F to regulate the lift of the valve independently of the gland, substantially as and for the purpose described.

JOHN ENRIGHT.

Witnesses:
J. H. BURRIDGE,
WEBSTER ROBERTS.